(12) United States Patent
Hou

(10) Patent No.: US 8,036,425 B2
(45) Date of Patent: Oct. 11, 2011

(54) NEURAL NETWORK-CONTROLLED AUTOMATIC TRACKING AND RECOGNIZING SYSTEM AND METHOD

(76) Inventor: Billy Hou, Taipei (TW)

( * ) Notice: Subject to any disclaimer, the term of this patent is extended or adjusted under 35 U.S.C. 154(b) by 765 days.

(21) Appl. No.: 12/213,902

(22) Filed: Jun. 26, 2008

(65) Prior Publication Data
US 2009/0324010 A1 Dec. 31, 2009

(51) Int. Cl.
*G06K 9/00* (2006.01)
*H04N 5/225* (2006.01)
*G10L 11/00* (2006.01)
*G06E 1/00* (2006.01)

(52) U.S. Cl. ........... 382/103; 348/169; 704/202; 706/15

(58) Field of Classification Search .................. 382/100, 382/103, 104, 107; 340/287, 425.5, 426.18, 340/438, 506, 577, 578, 584, 628, 901; 348/154, 348/155, 169–172, 208.14, 352; 700/48; 704/202, 232, 259; 706/2, 6, 15, 33, 41, 706/44

See application file for complete search history.

(56) References Cited

U.S. PATENT DOCUMENTS 5,581,242 A * 12/1996 Arita et al. ................. 340/691.6
6,747,687 B1 * 6/2004 Alves ............................ 348/148
7,469,060 B2 * 12/2008 Bazakos et al. ............... 382/173

* cited by examiner

*Primary Examiner* — Abolfazl Tabatabai
(74) *Attorney, Agent, or Firm* — Rosenberg, Klein & Lee

(57) ABSTRACT

A neural network-controlled automatic tracking and recognizing system includes a fixed field of view collection module, a full functions variable field of view collection module, a video image recognition algorithm module, a neural network control module, a suspect object track-tracking module, a database comparison and alarm judgment module, a monitored characteristic recording and rule setting module, a light monitoring and control module, a backlight module, an alarm output/display/storage module, and security monitoring sensors. The invention relates also to the operation method of the system.

10 Claims, 7 Drawing Sheets

NEURAL NETWORK-CONTROLLED AUTOMATIC TRACKING AND RECOGNIZING SYSTEM AND METHOD

BACKGROUND OF THE INVENTION

1. Field of the Invention

The present invention relates to intelligent safety monitoring technology and more particularly, to a neural network-controlled automatic tracking and recognizing system comprised of a fixed field of view collection module, a full functions variable field of view collection module, a video image recognition algorithm module, a neural network control module, a suspect object track-tracking module, a database comparison and alarm judgment module, a monitored characteristic recording and rule setting module, a light monitoring and control module, a backlight module, an alarm output/display/storage module, and security monitoring sensors.

2. Description of the Related Art

Following development of human civilization, people have strong demand for security. The developing trend of intelligent security technology has been changed from investigation after event to "preserving before event, prohibiting in the event and rapid dissolving after the event".

Many safety monitoring and control systems are known. However, conventional safety monitoring and control systems are still not satisfactory in function and have the following common drawbacks: 1. Fixed monitoring images, not able to catch characteristics of suspect object clearly, having dead corner in catching images, making after event investigation difficult; 2. No capability in preserving before event, no intelligent algorithm, no self-learning ability, no ability in detecting behavior of moving object against rule (such as detection on cross border, direction, cluster, etc.), no ability to identify identity of suspect object by means of biological recognition technology to achieve a preserving measures; 3. Not able to track the motion track and detail characteristics of suspect object; 4. Requiring a big amount of cameras, storage devices and main power to achieve monitoring operation.

There are advanced systems capable of recognizing behaviors of violation of moving object against rule, stealing behavior and properties left. However, these systems simply use sensing cameras to match with a computer for recognition and alarm, they cannot eliminate the problems of dead corner in catching images, being unable to track the motion track of suspect object and non-clearness detail characteristics of suspect object. More particularly, the small suspect object image scale causes recognition of identity of suspect object difficult.

SUMMARY OF THE INVENTION

The present invention has been accomplished under the circumstances in view. It is one object of the present invention to provide a neural network-controlled automatic tracking and recognizing system, which is capable of locking suspect object, tracking the motion track of suspect object, catching the detail characteristics of suspect object and recognizing the identity of suspect object by mans of biological recognition technology, thereby realizing preserving before event. It is another object of the present invention to provide a neural network-controlled automatic tracking and recognizing system, which achieves the requirements of early discovery, preserving before event, prohibiting in the event and rapid dissolving after the event. It is still another object of the present invention to provide a neural network-controlled automatic tracking and recognizing system, which employs network technology to have multiple systems be linked for safety monitoring of a big area, for example, a building. It is still another object of the present invention to provide a neural network-controlled automatic tracking and recognizing system, which has backlight source means and utilizes night vision cameras for working at night or under an environment where surrounding light is insufficient.

To achieve these and other objects of the present invention, the neural network-controlled automatic tracking and recognizing system comprises a fixed field of view collection module, the fixed field of view collection module comprising a plurality of sensing cameras for collecting view images of fixed spots; a full functions variable field of view collection module, the full functions variable field of view collection module comprising a plurality of full functions tracking camera for catching images of a suspect moving object appeared in the coverage of the fixed field of view collection module within 360-degrees; a video image recognition algorithm module comprising a series of algorithms adapted for picking up a target object from video images collected by the full functions variable field of view collection module for analysis to identify the characteristic parts of the target object such as human face and car license number; a neural network control module for controlling angle matching of the full functions tracking cameras with the sensing cameras and for controlling the angle of rotation, focus and aperture of the full functions tracking cameras subject to the allowable moving object moving direction in the fixed field of view so that the full functions cameras are controlled to track every suspect moving object and to catch the detail characteristics of every suspect moving object; a suspect object track-tracking module adapted for tracking the track of the suspect target such as human face or object gravity center subject the images obtained through the sensing cameras, and recording/building up the motion track of the suspect object subject to the recognition results of the algorithms of the video image recognition algorithm module; a database comparison and alarm judgment module adapted for fetching human face data, suspect object characteristic data, and other related database data for comparison subject to the recognition results of the algorithms of the video image recognition algorithm module, and determining a report of alarm of "cross border", "enter restricted area", "wrong moving direction", etc., subject to set rules; a monitored characteristic recording and rule setting module adapted for the input of characteristics of target object, such as human face image, to establish a database, and for the setting of alarm rule and sensitivity grade subject to requirements of the monitored area; a light monitoring and control module adapted for analyzing surrounding light status subject to video images obtained through the sensing cameras and full functions tracking cameras of the fixed field of view collection module and the full functions variable field of view collection module, and controlling a backlight module to provide back light when the surrounding light is insufficient for monitoring; a backlight module controllable by the light monitoring and control module to turn on infrared light source means and artificial light source means thereof to provide a backlight subject the condition of the monitored site; an alarm output/display/storage module adapted for displaying alarm information and relay output and for management and storage of monitored video images and alarm information; and security monitoring sensors linked with other security monitoring systems in such a manner that when the security monitoring sensors are started, the full functions tracking cameras are controlled to catch the desired data.

Further, the video image recognition algorithm module comprises a human figure recognition algorithm, a human head positioning algorithm, a moving object recognition algorithm, a behavior recognition algorithm, and a characteristic recognition algorithm.

When compared with conventional designs, the invention has the following advantages:

1. Full functions variable field of view monitoring capability. By means of neural network-controlled sensing and full functions tracking cameras, the system effectively catches detail characteristics of a suspect object for recognition of human face and particular part of the suspect object by means of biological recognition and image recognition techniques and comparison with characteristic parameters from database. Upon recognition of the suspect object, an alarm report is given on the real time.

2. The system has a behavior recognition function to analyze the behaviors of a person and any moving object. When the behavior of a moving object violates the rules, the system immediately gives an alarm report.

3. The system is capable of tracking the motion track of the suspect target and indicating the motion track of the suspect target on the video images and architecture plan, assuring the moving direction of the suspect target.

In general, the invention provides a neural network-controlled automatic tracking and recognizing system, which achieves the requirements of early discovery, preserving before event, prohibiting in the event and rapid dissolving after the event

DETAILED DESCRIPTION OF THE PREFERRED EMBODIMENT

Figure 1:
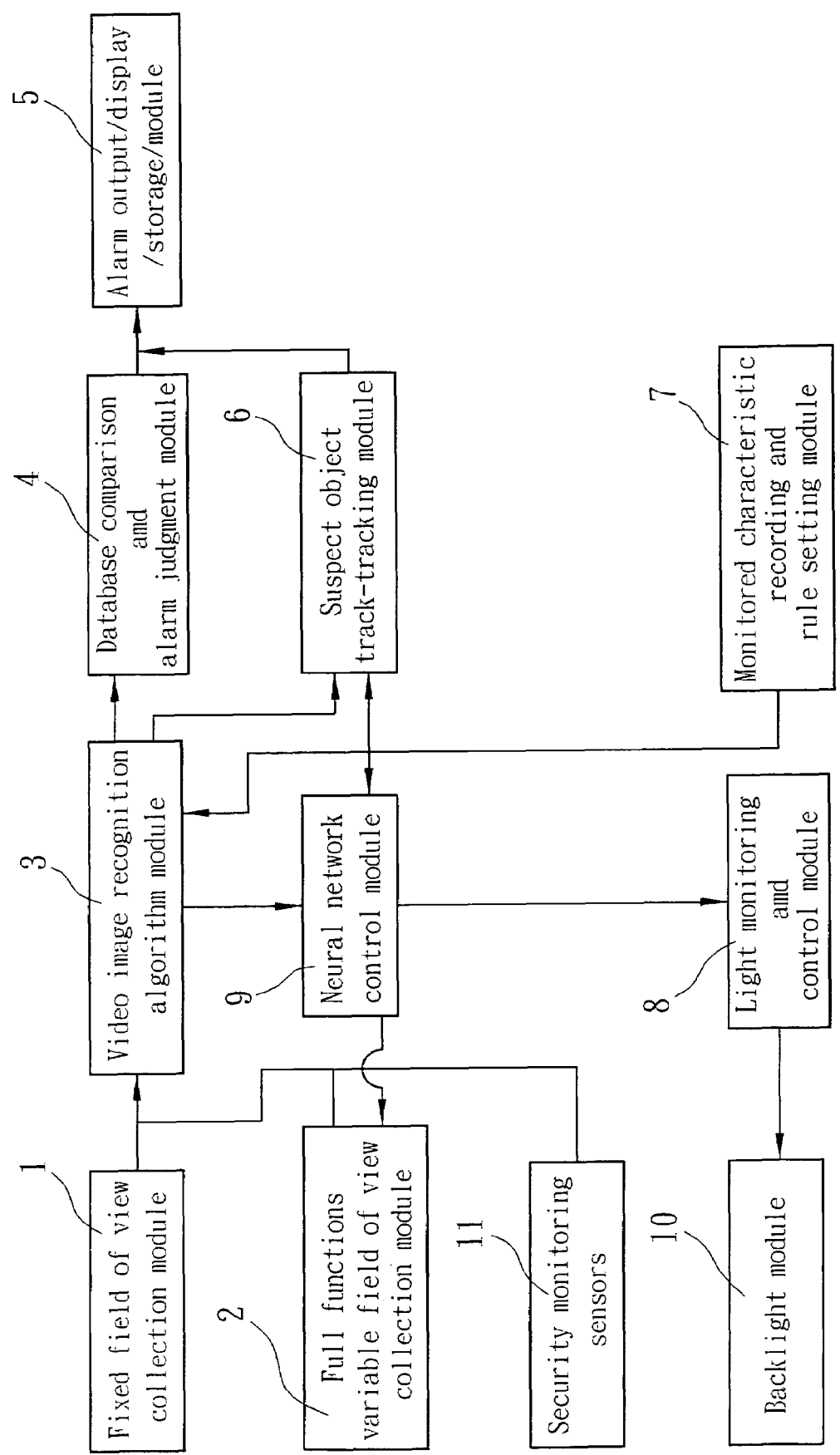
FIG. 1 is a system block diagram of a neural network-controlled automatic tracking and recognizing system in accordance with the present invention.

FIG. 1 is a system block diagram of a neural network-controlled automatic tracking and recognizing system in accordance with the present invention. The system is comprised of a fixed field of view collection module 1, a full functions variable field of view collection module 2, video image recognition algorithm module 3, a neural network control module 9, a suspect object track-tracking module 6, a database comparison and alarm judgment module 4, a monitored characteristic recording and rule setting module 7, a light monitoring and control module 8, an alarm output/display/storage module 5, a backlight module 10, and security monitoring sensors 11.

The fixed field of view collection module 1 utilizes pistol or ball type sensing cameras to collect view images of fixed spots. Normally, three sensing cameras are arranged in set for a local area. The cameras can be ordinary video cameras, or B&W infrared night vision video cameras.

The full functions variable field of view collection module 2 utilizes high-speed pan-tilt-zoom cameras or dome cameras to catch images of any suspect moving object within 360-degrees angle of the coverage of each camera. Subject to installation environment, the cameras can be ordinary cameras or B&W infrared night vision video cameras. The full functions variable field of view collection module 2 receives control signal from the neural network control module 9 to adjust angle and focus, enabling a characteristic part of the suspect object, for example, the face of a human being to be shown on the center area of the picture at a predetermined scale.

Further, the cameras of the fixed field of view collection module 1 and full functions variable field of view collection module 2 can be CCD (charge coupled device)/CMOS (complementary metal-oxide semiconductor) video cameras or thermal imaging cameras.

The video image recognition algorithm module 3 comprises a human figure recognition algorithm, a human head positioning algorithm, a moving object recognition algorithm, a behavior recognition algorithm, and a characteristic recognition algorithm. The target is picked up from the collected video images and classified, and the characteristic part of the target is then recognized. The moving object recognition algorithm uses different matching parameters to recognize the target subject to the type of the object, for example, using the characteristic parameters of height-width ratio, upper limb-lower limb ratio and head-body ratio to recognize the target. The behavior recognition algorithm is to recognize different behaviors including cross border, moving direction, moving speed, stealing behavior, properties left behind, and etc. The characteristic recognition algorithm is to compute the parameters of the characteristic parts of caught images, such as the characteristics of the skin color of human face, interpupillary width, skeleton features, futures of five sense organs, and etc.

The neural network control module 9 constitutes a closed loop control system by means of full functions tracking cameras images. The neural network control module 9 rapidly controls the full functions tracking cameras to the coarse adjustment angle subject manual control settings and then automatically controls fine adjustment of the angle and focus of the full functions tracking cameras to catch the characteristic part of the suspect object till that the characteristic part of the suspect object is located on the center area of the image and the area of the characteristic part of the suspect object in the image is not less than 15%. Following movement of the target, the neural network control module 9 controls the full functions tracking cameras to rotate and to adjust the focus, continuously tracking the characteristic part of the suspect object.

The suspect object track-tracking module 6 tracks the track of any suspect target subject sensing camera images. It selects tract formation characteristics, such as human face or object gravity center, subject to the type of the target object, and records/builds up the motion track of the suspect object subject to the recognition results of the algorithms. The motion track can be converted into architecture plan coordinates data, if necessary. The system has built therein a corresponding coordinates conversion algorithm.

The database comparison and alarm judgment module 4 fetches human face data, suspect object characteristic data, or any other data from the database for comparison subject to the recognition results of the algorithms, and determines a report of alarm of "cross border", "enter restricted area", "wrong moving direction", etc., subject to set rules. Suspect object detail characteristic alarm report rule can be defined to be: alarm in conformity with database characteristics, or alarm not conformity with database characteristics.

The monitored characteristic recording and rule setting module 7 is for the input of characteristics of target object, for example, human face image to establish a database, and allows setting of the alarm rule and sensitivity grade subject to requirements of the monitored area. The recording method can be a real-time characteristic recording to have the operator catch data on the real time. Alternatively, the recording method can be achieved by means of feeding in the currently available data. Further, in order to assure system reliability, the monitored characteristic recording and rule setting module 7 automatically updates recognized data characteristics or stores recognized data characteristics in the database.

The light monitoring and control module 8 analyzes surrounding light status subject to video images obtained through the fixed field of view collection module 1 and the full functions variable field of view collection module 2, and controls the backlight module 10 to provide back light when the surrounding light is insufficient for monitoring.

The backlight module 10 is controllable by the light monitoring and control module 8 to turn on an infrared light source or artificial light source subject the condition of the monitored site, providing a backlight.

The alarm output/display/storage module 5 is adapted for displaying alarm information and relay output, as well as for management and storage of monitored video images and alarm information.

The security monitoring sensors 11 are linked with other security monitoring systems. When the security monitoring sensors are started, the full functions tracking cameras can also be controlled to catch the desired data.

Figure 2:
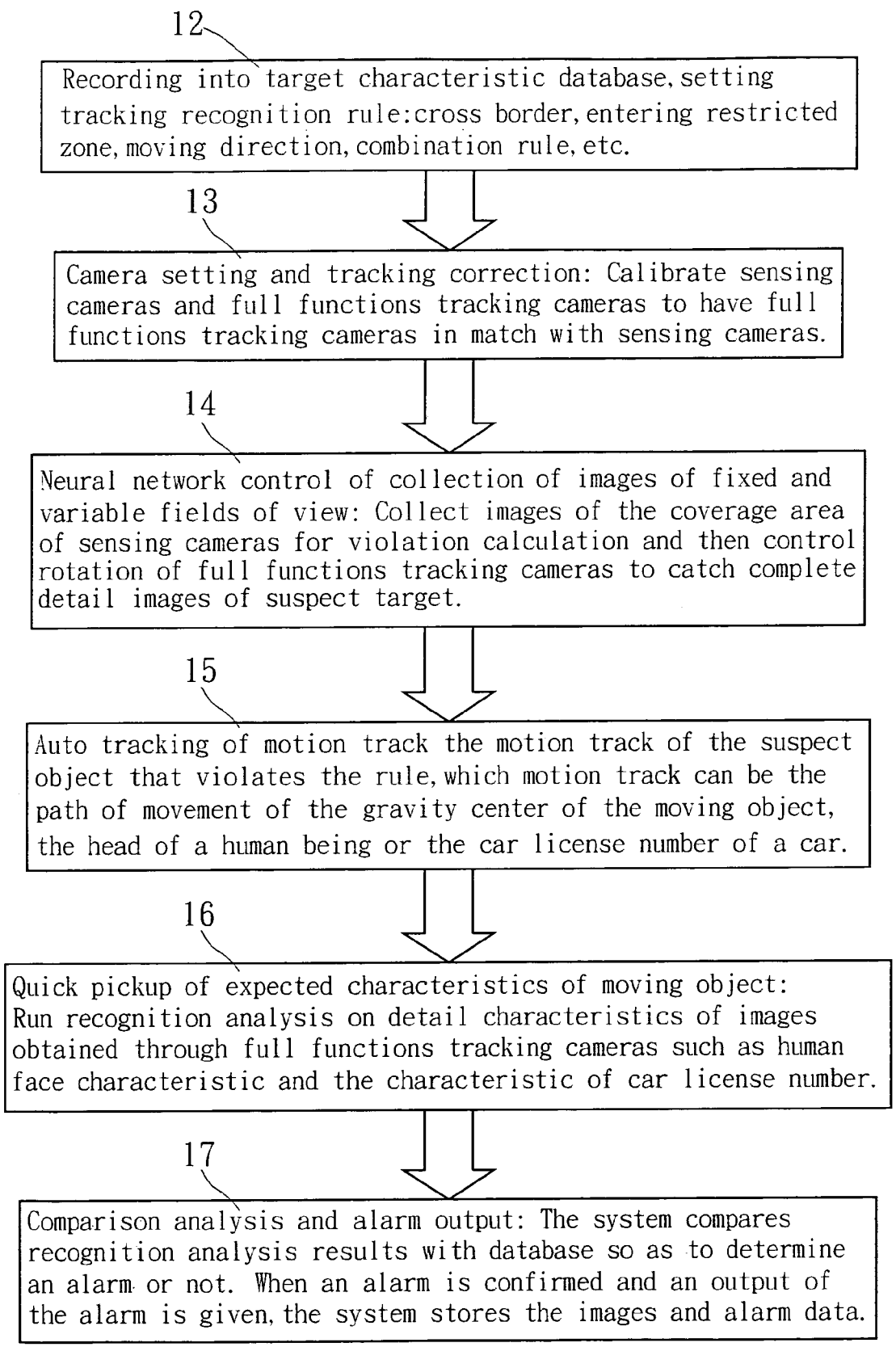
FIG. 2 is an operation flow chart showing the operation of the present invention.

FIG. 2 is an operation flow chart showing the operation of the present invention. The neural network-controlled automatic tracking and recognizing system operates subject to the following steps:

(1) Drive the sensing cameras and full functions tracking cameras to catch target images and the related algorithms to pick up target characteristic parameters for storing in the database, and also guide pre-recorded images or target characteristic parameters into the system database. With respect to recognition of suspect target, it is determined subject to a behavior rule pre-set by the client, such as cross border, moving direction abnormality, moving speed abnormality, stealing behavior, etc. When a moving object violets the rule, it is regarded as "suspect object".

Figure 4A:
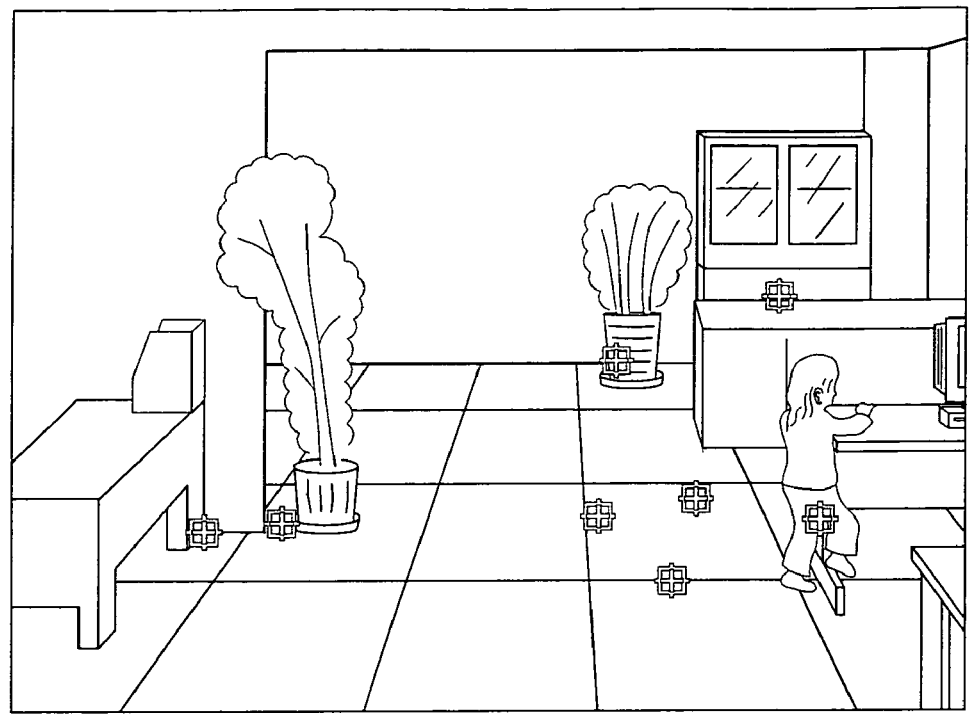
FIGS. 4A and 4B illustrate coarse correction of angle of mapping of the sensing cameras and full functions tracking cameras of the computer/DSP (digital signal processor)-based area tracking and recognizing system in accordance with the present invention.
Figure 4B:
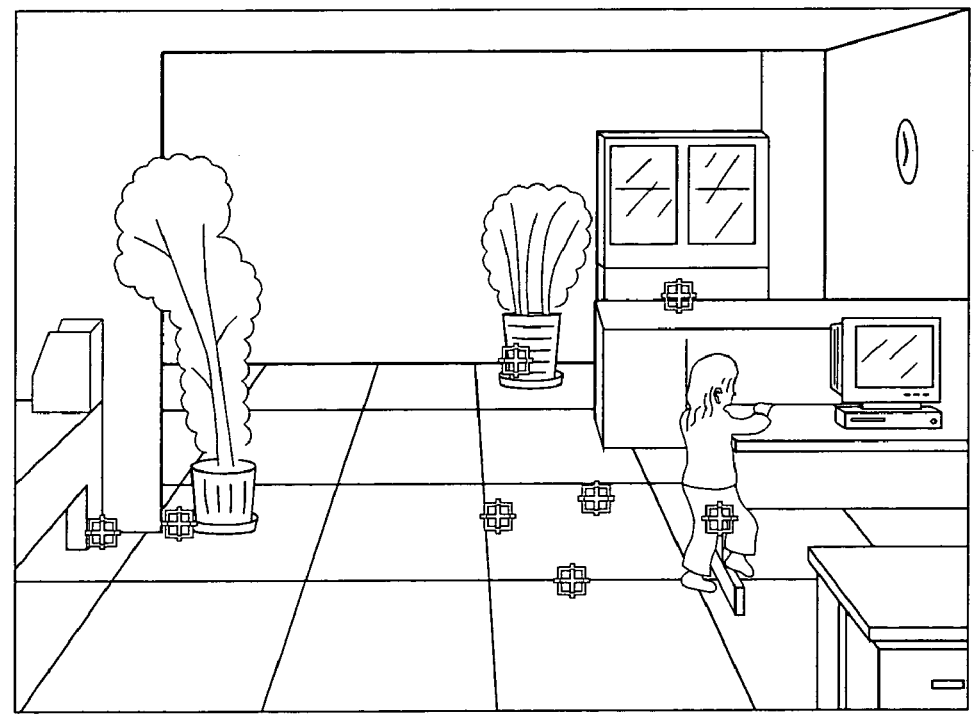

(2) Camera position correction to have the monitoring area of the full functions tracking cameras and sensing cameras be combined together for associating mapping. As illustrated in FIG. 4, by means of manual adjustment of the angle and focus of the full functions tracking cameras, selected points of images obtained from the full functions tracking cameras are corresponded to corresponding points of images obtained from the sensing cameras, so that a parameter is provided for the control of the viewing angle of the full functions tracking cameras in neural network control, enabling the neural network control module to control the default viewing angle of the full functions tracking cameras in matching with the sensing cameras in coarse adjustment. After through a further fine adjustment and control, the full functions tracking cameras catch the detail characteristics of the suspect target.

(3) The system continuously collect the video images from the sensing cameras for analysis by the main unit. When a suspect target is found, the neural network control module of the system controls the rotation, focus adjustment and aperture of the full functions tracking cameras to catch the images of the suspect target, keeping the characteristic part of the suspect target on the center area of each image and the area of the characteristic part of the suspect target in each image to be not less than 15%. Following movement of the target, the neural network control module 9 controls the full functions tracking cameras to rotate and to adjust the focus, continuously tracking the characteristic part of the suspect object. Further, when the environment light intensity is insufficient to satisfy minimum working need, the light monitoring and control module controls the backlight module to provide a backlight. At the same time, the work mode of the cameras is relatively controlled subject to the type of the backlight. For example, when the backlight is near infrared, the cameras are switched to B&W and night vision mode.

(4) The system performs an intelligent image analysis on the video images collected from the sensing cameras, checking any behavior that violate the behavior rule, such as cross border, wrong moving direction, abnormal moving speed, stealing behavior, etc. When any violation behavior is found, the target is regarded as a suspect target. At this time, the system automatically tracks the motion track of the suspect target. The motion track can be the gravity center or human head subject to the type of the monitored object. Further, the motion track can be the track in the field of view or the track in an architecture plan obtained through a linear conversion.

(5) The system performs an intelligent image analysis on the video images obtained through the full functions tracking cameras by means of a biological identification technology to pick up a characteristic part of the suspect target and the related parameters. The related parameters include skin color of human face, interpupillary width, skeleton features, features of five sense organs, car license number, car license color, and etc.

(6) The system compares the characteristic parameters of the suspect target thus obtained with the characteristic parameters stored in the database, and then gives a respective alarm report to any item that is not in conformity with the set conditions. The alarm rules and conditions include alarms in conformity with database characteristics, and alarms not conformity with database characteristics. With respect to any recognized characteristic, the system performs a self-learning program, and stores the newly obtained new characteristic parameter in the database.

Figure 3:
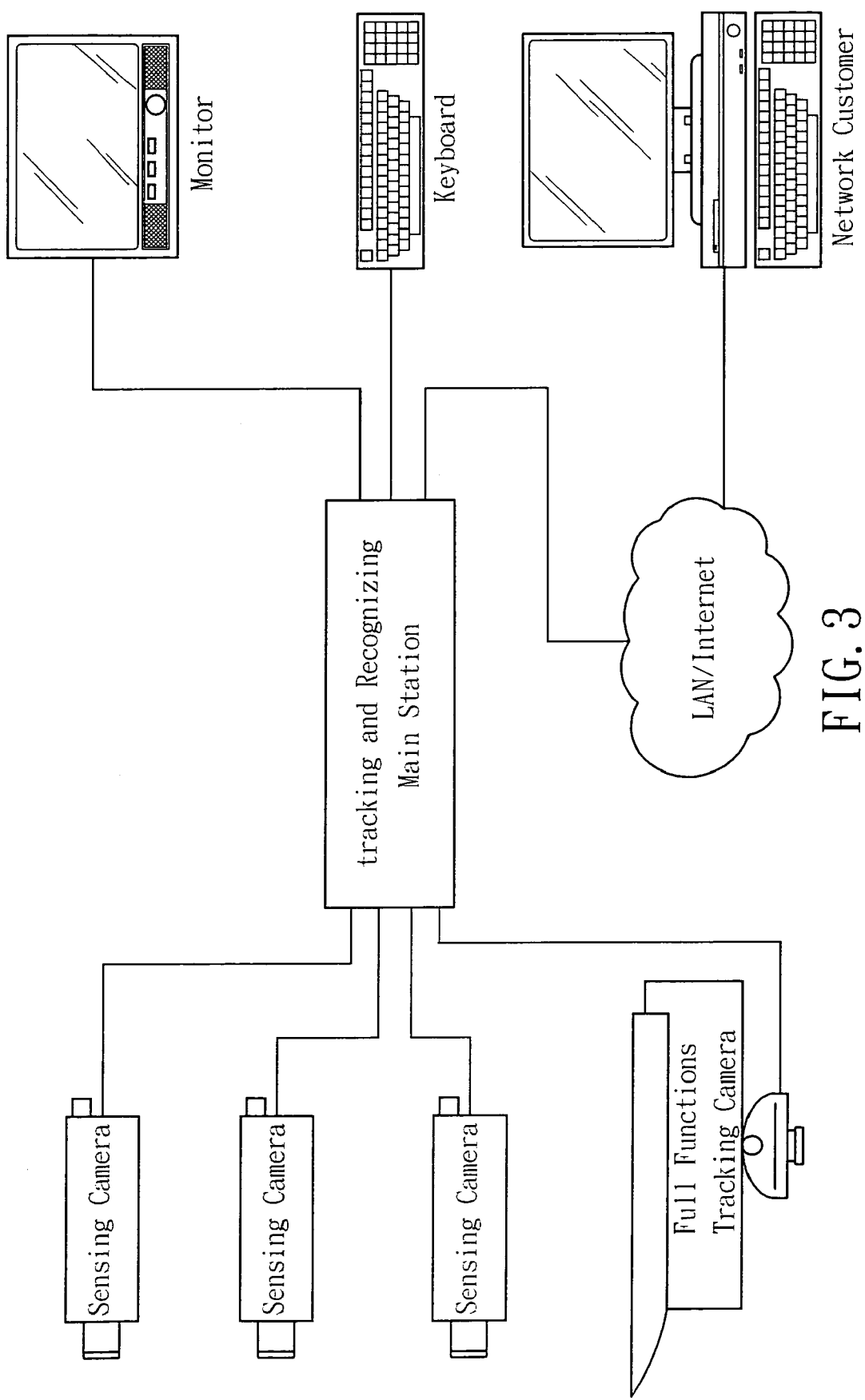
FIG. 3 illustrated a computer/DSP (digital signal processor)-based area tracking and recognizing system in accordance with the present invention.

FIG. 3 illustrated a computer/DSP (digital signal processor)-based area tracking and recognizing system in accordance with the present invention. As illustrated, the computer/DSP (digital signal processor)-based area tracking and recognizing system is comprised of sensing cameras, a full functions tracking camera, a tracking and recognizing main station, input/output equipment (for example, monitor and keyboard), and a LAN/internet equipment. The tracking and recognizing main station is the core of the system adapted for performing a series of functions including image collection, recognition, judgment, neural network control, moving track tracing, light intensity monitoring and control, recording of monitored characteristics and rule setting, alarm report output, and data access. The full functions tracking camera is controlled to rotate and to adjust the focus subject to the neural network command of the tracking and recognizing main station, thereby catching the detail characteristic images of the suspect target. The system outputs alarm information through a monitor. The system also provides a network function for transfer of data and moving direction prompt among linked systems so that the whole system effectively monitors a greater guard area.

The computer/DSP (digital signal processor)-based area tracking and recognizing system of the present invention is capable of tracking multiple suspect targets in the coverage area and catching the detail characteristic of every suspect target. These functions are achieved by means of: 1. Roll-poll the sensing cameras to lock any suspect target that violates the rule; 2. Run cluster analysis. When discovered a cluster of people or moving objects, the system catches the nearest suspect target whose characteristic part is clear; 3. When distributed suspect targets are discovered, the system adopts roll polling to catch the characteristic part of every suspect target for recognition and calculation. The system is capable of tracking more than 6 suspect targets at a time.

The computer/DSP (digital signal processor)-based area tracking and recognizing system can establishes a network system by means of intranet technology, thereby covering the whole area of a big building. When a suspect target escaped out of one of the linked system, the adjacent neighbor system immediately enters the tracking status to catch the images of the suspect target so that the characteristic parameters of the suspect target are transmitted from the main station of one system in the network to another, enabling the linked system to track the suspect target within a big area.

Figure 5A:
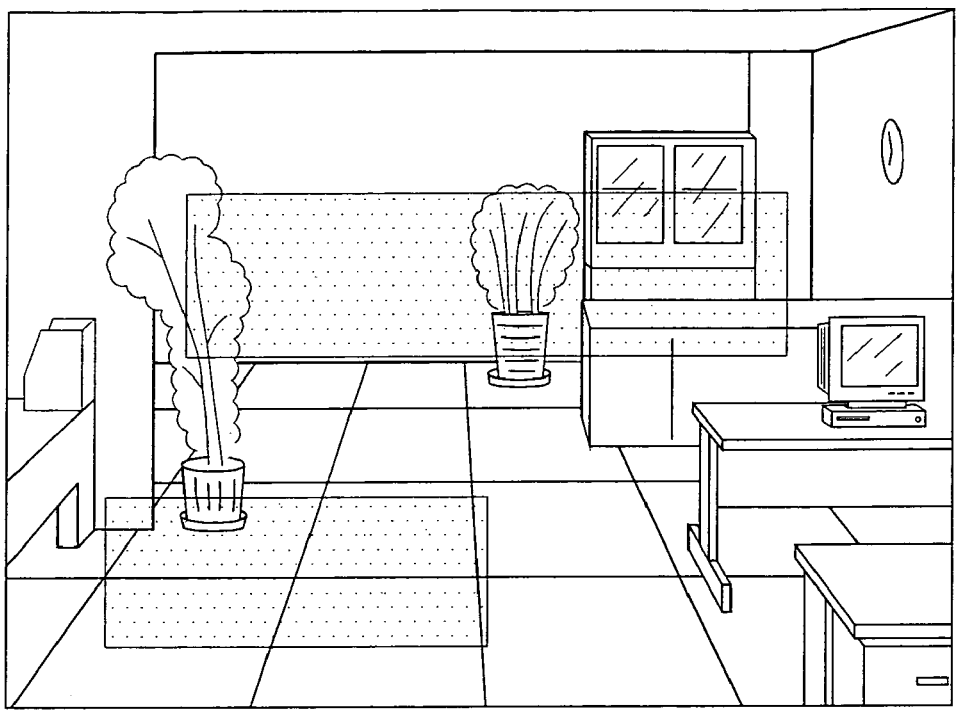
FIGS. 5A and 5B illustrate setting of behavior rules according to the present invention.
Figure 5B:
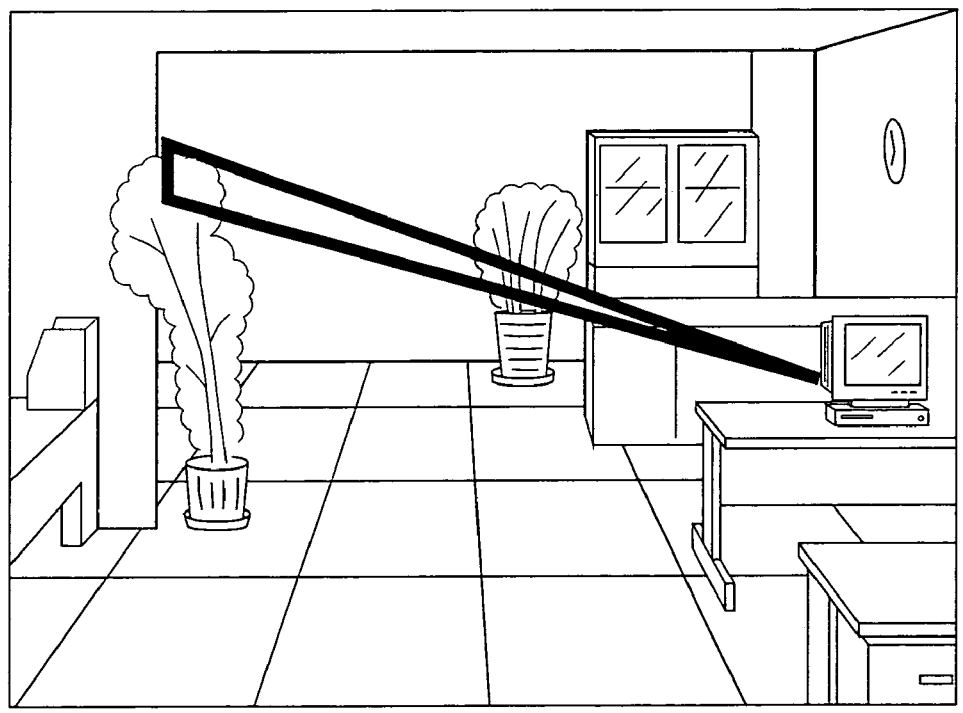

FIGS. 5A and 5B illustrate setting of behavior rules according to the present invention, including settings of restricted areas, allowable moving direction, and etc. The settings can be done by means of a system software to satisfy client's individual requirements.

Figure 6A:
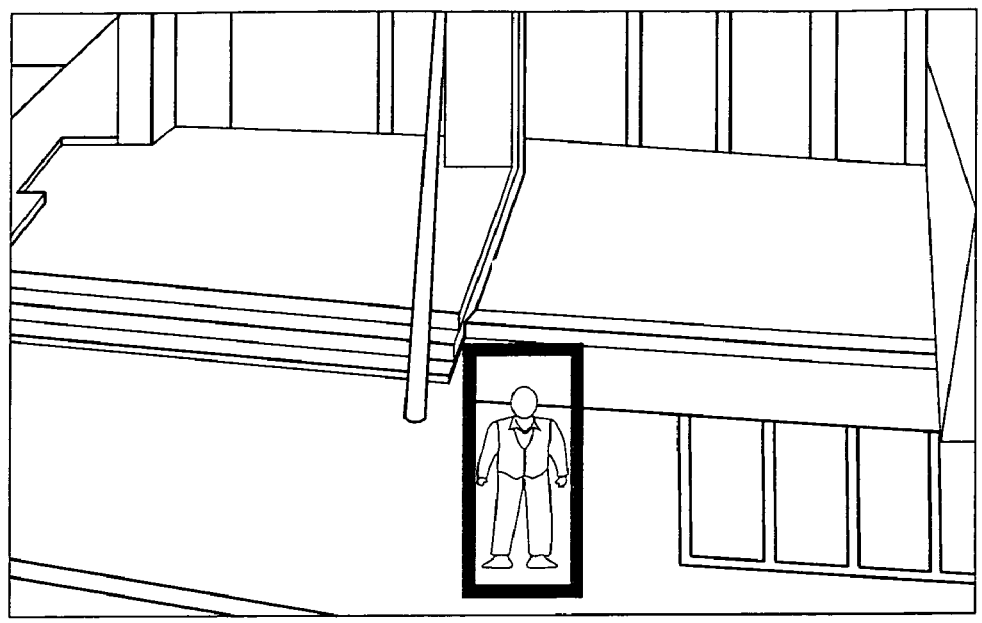
FIGS. 6A~6D illustrate contrast between the image of suspect target obtained through the neural network-controlled automatic tracking and recognizing system of the present invention and the image of suspect target obtained through a conventional video image monitoring system.
Figure 6B:
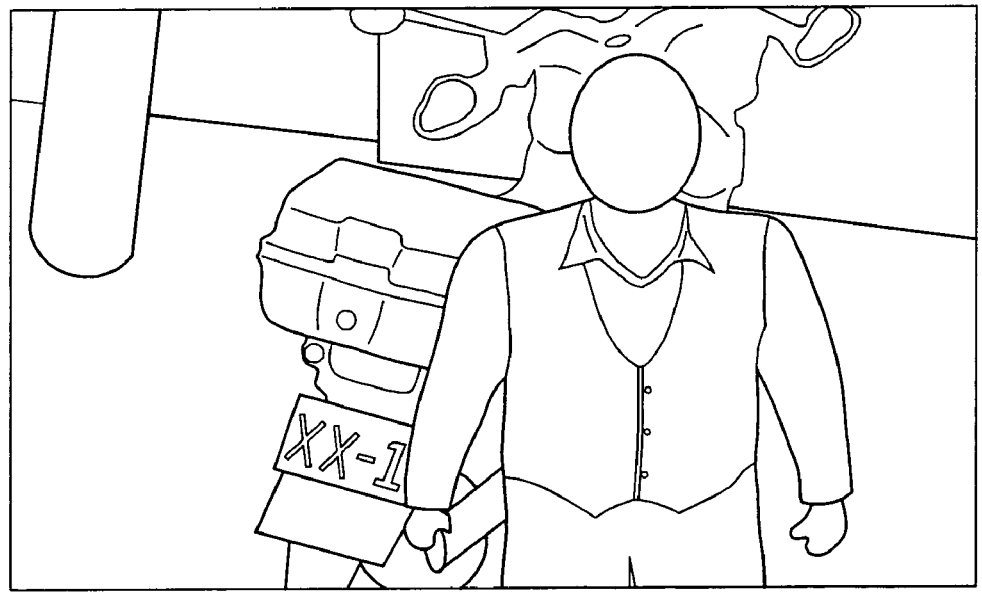
Figure 6C:
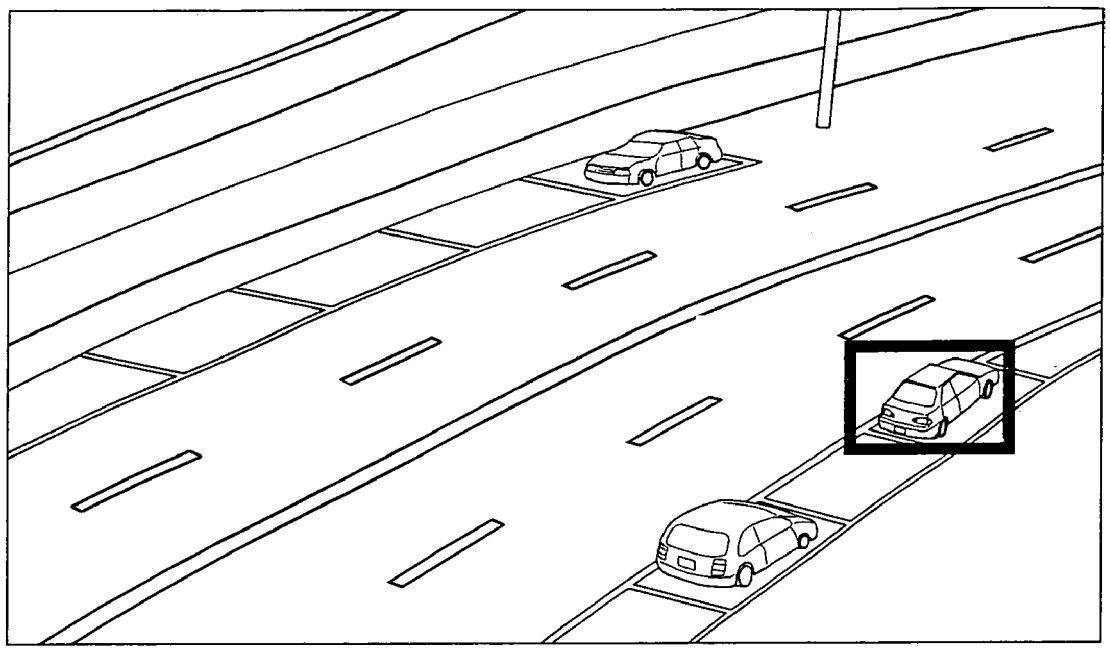
Figure 6D:
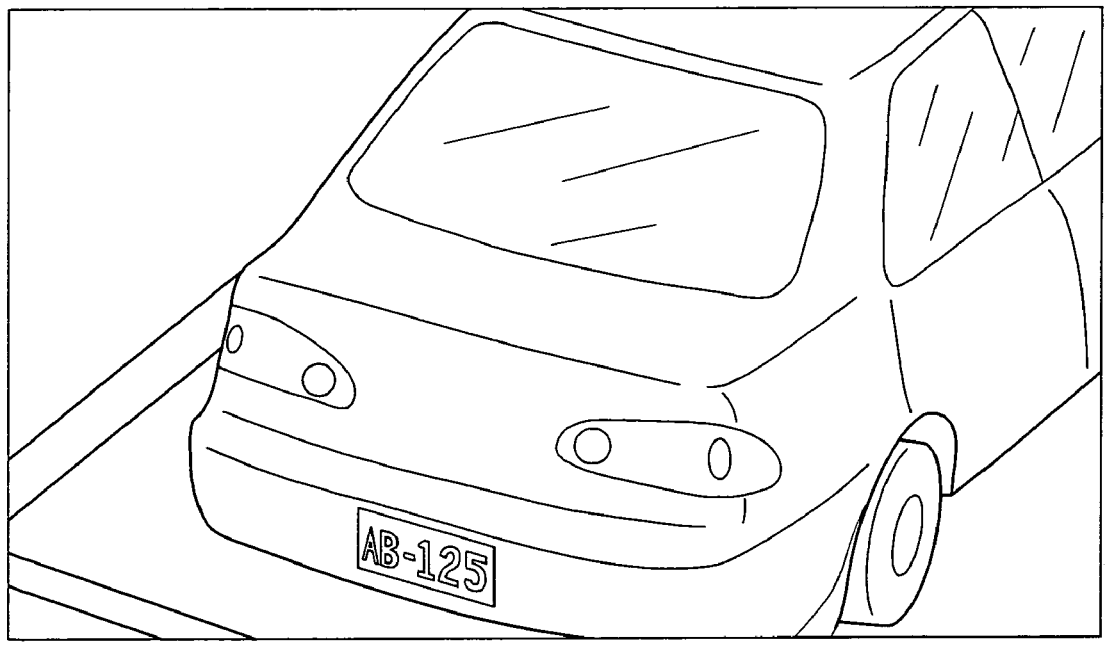

FIGS. 6A~6D illustrate contrast between the image of suspect target obtained through the neural network-controlled automatic tracking and recognizing system of the present invention and the image of suspect target obtained through a conventional video image monitoring system. FIG. 6A is an image of the front door of a bank obtained through of one camera of a conventional monitoring system where the face features and license number of the suspect target are vague. FIG. 6B is an image of the front door of the same bank obtained at the same time through the neural network-controlled automatic tracking and recognizing system of the present invention where the face features and license number of the suspect target are clearly seen. When the characteristics of the suspect target matched the characteristics of criminal of the database, the system immediately gives an alarm report. FIG. 6C is an image of a No-parking zone obtained through of a conventional monitoring system where the detail characteristics of the violation vehicle are not recognizable. FIG. 6D is an image of the same No-parking zone obtained at the same time through the neural network-controlled automatic tracking and recognizing system of the present invention where the detail characteristics of the violation vehicle are well recognizable so that the recognized car license number can recorded on record for further processing.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A neural network-controlled automatic tracking and recognizing system, comprising:
a fixed field of view collection module, said fixed field of view collection module comprising a plurality of sensing cameras for collecting view images of fixed spots;
a full functions variable field of view collection module, said full functions variable field of view collection module comprising a plurality of full functions tracking cameras for catching images of a suspect moving object appeared in the coverage of said fixed field of view collection module within 360-degrees;
a video image recognition algorithm module comprising a series of algorithms adapted for picking up a target object from video images collected by said full functions variable field of view collection module for analysis to identify the characteristic parts of the target object such as human face and car license number;
a neural network control module for controlling angle matching of said full functions tracking cameras with said sensing cameras and for controlling the angle of rotation, focus and aperture of said full functions tracking cameras subject to the allowable moving object moving direction in the fixed field of view so that said full functions cameras are controlled to track every suspect moving object and to catch the detail characteristics of every suspect moving object;
a suspect object track-tracking module adapted for tracking the track of the suspect target such as human face or object gravity center subject the images obtained through said sensing cameras, and recording/building up the motion track of the suspect object subject to the recognition results of the algorithms of said video image recognition algorithm module;
a database comparison and alarm judgment module adapted for fetching human face data, suspect object characteristic data, and other related database data for comparison subject to the recognition results of the algorithms of said video image recognition algorithm module, and determining a report of alarm of "cross border", "enter restricted area", "wrong moving direction", etc., subject to set rules;
a monitored characteristic recording and rule setting module adapted for the input of characteristics of target object, such as human face image, to establish a database, and for the setting of alarm rule and sensitivity grade subject to requirements of the monitored area;
a light monitoring and control module adapted for analyzing surrounding light status subject to video images obtained through the sensing cameras and full functions tracking cameras of said fixed field of view collection module and said full functions variable field of view collection module, and controlling a backlight module to provide back light when the surrounding light is insufficient for monitoring;
a backlight module controllable by said light monitoring and control module to turn on infrared light source means and artificial light source means thereof to provide a backlight subject the condition of the monitored site;
an alarm output/display/storage module adapted for displaying alarm information and relay output and for management and storage of monitored video images and alarm information; and
security monitoring sensors linked with other security monitoring systems in such a manner that when the security monitoring sensors are started, said full functions tracking cameras are controlled to catch the desired data.

2. The neural network-controlled automatic tracking and recognizing system as claimed in claim 1, wherein said sensing cameras are pistol/ball type cameras; said full functions tracking cameras are high-speed pan-tilt-zoom cameras/ dome cameras; said sensing cameras and said full functions tracking cameras are selectable from the group of CCD (charge coupled device), CMOS (complementary metal-oxide semiconductor) and thermal imaging cameras.

3. The neural network-controlled automatic tracking and recognizing system as claimed in claim 1, wherein said video image recognition algorithm module comprises a human figure recognition algorithm, a human head positioning algorithm, a moving object recognition algorithm, a behavior recognition algorithm, and a characteristic recognition algorithm.

4. The neural network-controlled automatic tracking and recognizing system as claimed in claim 1, which adopts a neural network control method to catch the target object like the functioning of a human eye by means of driving said sensing cameras to lock the suspect object and then driving said full functions tracking cameras to track the target object, catching the important characteristics of the target object including human face and car license number.

5. The neural network-controlled automatic tracking and recognizing system as claimed in claim 1, which said video image recognition algorithm module comprises a behavior recognition algorithm adapted for recognizing different behaviors including cross border, moving direction, moving speed, stealing behavior, properties left behind, and etc.

6. The neural network-controlled automatic tracking and recognizing system as claimed in claim 1, which said backlight module comprises near infrared light source means and visible light source means; said sensing cameras and said full functions tracking cameras have a night vision function for catching near infrared images of a moving object.

7. A neural network-controlled automatic tracking and recognizing method comprising the steps of:
  (1) driving sensing cameras and full functions tracking cameras to catch target images and driving predetermined algorithms to pick up target characteristic parameters including human face image and characteristics and car license number for storing in a system database, guiding pre-recorded images or target characteristic parameters into the system database, and setting behavior rules including cross border, moving direction abnormality, moving speed abnormality and moving direction abnormality;
  (2) Camera position correction to have the monitoring area of said full functions tracking cameras and sensing cameras be combined together for associating mapping, by means of manual adjustment of the angle and focus of said full functions tracking cameras, selected points of images obtained from said full functions tracking cameras being corresponded to corresponding points of images obtained from said sensing cameras, so that a parameter is provided for the control of the viewing angle of said full functions tracking cameras in neural network control for enabling a neural network control module to control the default viewing angle of said full functions tracking cameras in matching with said sensing cameras in coarse adjustment. After through a further fine adjustment and control, the full functions tracking cameras catch the detail characteristics of the suspect target.
  (3) The system continuously collecting the video images from said sensing cameras for analysis in such a manner that when a suspect target is found, said neural network control module controls the rotation, focus adjustment and aperture of said full functions tracking cameras to catch the images of the suspect target, keeping the characteristic part of the suspect target on the center area of each image and the area of the characteristic part of the suspect target in each image to be not less than 15%; following movement of the target, said neural network control module controls said full functions tracking cameras to rotate and to adjust the focus, continuously tracking the characteristic part of the suspect object;
  (4) The system performs an intelligent image analysis on the video images collected from said sensing cameras, checking every behavior against the behavior rule, such as cross border, wrong moving direction, abnormal moving speed, stealing behavior, etc; when a violation behavior is found, the target is regarded as a suspect target, and at the same time the system automatically tracks the motion track of the suspect target such as the gravity center or human head subject to the type of the monitored object;
  (5) The system performs an intelligent image analysis on the video images obtained through said full functions tracking cameras by means of a biological identification technology to pick up a characteristic part of the suspect target and the related parameters, the related parameters including skin color of human face, interpupillary width, skeleton features, features of five sense organs, car license number and car license color.
  (6) The system compares the characteristic parameters of the suspect target thus obtained with the characteristic parameters stored in the database, and then gives a respective alarm report to every item that is not in conformity with the set conditions; the alarm rules and conditions include alarms in conformity with database characteristics, and alarms not conformity with database characteristics, with respect to any recognized characteristic, the system performs a self-learning program and stores the newly obtained new characteristic parameter in the database.

8. The neural network-controlled automatic tracking and recognizing method as claimed in claim 7, wherein the establishment of target characteristics database is done by means of recording of system monitored target characteristics and real time recording by a monitored characteristic recording and rule setting module, for example, recording different angles and profiles of human face images on the real time or storing pre-recorded images into the database.

9. The neural network-controlled automatic tracking and recognizing method as claimed in claim 7, wherein during step (4) in tracking the motion track of the suspect target is to complete track calculation, tracking and marking within the coverage of the video images and to map track coordinates onto architecture plan coordinates so as to mark the track of the suspect target on the architecture plan.

10. The neural network-controlled automatic tracking and recognizing method as claimed in claim 7, wherein the step (5) in picking up a characteristic part of the suspect target and the related parameters comprises the sub-steps of:
  (a) analyzing every image of the series of images obtained from the sensing cameras so as to pick up moving objects and to calculate parameters of proportional characteristics, color distribution characteristics, marks of violation to rule, gravity center, motion track and direction predication of moving objects;
  (b) catching enlarged detail image of the suspect object against rules through a full functions variable field of view collection module so as to pick up a characteristic part of the subject object such as human face or car license number;

(c) calculating the parameters of the characteristic part of the suspect object, including body-size ratio, human face skeleton features, interpupillary width, futures of five sense organs, skin color, car license number and car color; and (d) Roll-polling the sensing cameras to lock each of suspect targets appeared in the monitoring area, and running cluster analysis when a cluster of moving objects appeared where the system catches the nearest suspect target whose characteristic part is clear, and the system adopts roll polling to catch the characteristic part of every suspect target for recognition and calculation when distributed suspect targets are discovered.

* * * * *